United States Patent
Mashimo et al.

(10) Patent No.: US 8,503,891 B2
(45) Date of Patent: Aug. 6, 2013

(54) MULTIRATE BURST MODE RECEIVER

(75) Inventors: Daisuke Mashimo, Kawasaki (JP); Masahito Takei, Tokyo (JP); Jun Sugawa, Kamakura (JP); Hiroki Ikeda, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 13/011,280

(22) Filed: Jan. 21, 2011

(65) Prior Publication Data

US 2011/0222866 A1 Sep. 15, 2011

(30) Foreign Application Priority Data

Mar. 12, 2010 (JP) ................. 2010-055283

(51) Int. Cl.
*H04B 10/06* (2006.01)
(52) U.S. Cl.
USPC ........... 398/209; 398/202; 398/212; 398/213; 398/58; 398/66
(58) Field of Classification Search
None
See application file for complete search history.

(56) References Cited

U.S. PATENT DOCUMENTS

| | | | |
|---|---|---|---|
| 7,583,898 B1 * | 9/2009 | Dalton et al. ................. | 398/100 |
| 2002/0089737 A1 * | 7/2002 | Sugata et al. ................. | 359/326 |
| 2003/0002108 A1 * | 1/2003 | Ames et al. ................... | 359/152 |
| 2003/0007224 A1 * | 1/2003 | Yamashita et al. ........... | 359/189 |
| 2006/0268969 A1 * | 11/2006 | Kimura et al. ................ | 375/225 |
| 2007/0160371 A1 * | 7/2007 | Irie ................................ | 398/43 |
| 2009/0034964 A1 * | 2/2009 | Sakai et al. ................... | 398/17 |
| 2012/0045213 A1 * | 2/2012 | Miura ............................ | 398/98 |

FOREIGN PATENT DOCUMENTS

| | | |
|---|---|---|
| JP | 2005-348047 A | 12/2005 |
| JP | 2007-243285 A | 9/2007 |

OTHER PUBLICATIONS

IEEE, "Part 3: Carrier Sense Multiple Access with Collision Detection (CSMA/CD) Access Method and Physical Layer Specifications; Amendment 1: Physical Layer Specifications and Management Parameters for 10 Gb/s Passive Optical Networks", IEEE Standard for Information Technology—Telecommunications and Information Exchange Between Systems—Local and Metropolitan Area Networks—Specific Requirements, Oct. 30, 2009, pp. 44-46.
Kazutaka Hara, et al., "Burst-mode Bit-rate Discrimination Circuit for 1.25/10.3-Gbit/s Dual-rate PON Systems", NTT Access Network Service Systems Laboratories, 2009.

* cited by examiner

*Primary Examiner* — Li Liu
(74) *Attorney, Agent, or Firm* — Crowell & Moring LLP

(57) ABSTRACT

There is a need to provide a multirate burst mode receiver for an OLT to be capable of receiving a high-speed burst signal without the need for a special capability of an ONU in a PON system including a mix of ONUs at different transmission bit rates. A multirate burst mode receiver according to the invention includes a signal input discrimination section and a bit rate discrimination section. The signal input discrimination section detects an average amplitude to discriminate signal input. The bit rate discrimination section detects an envelope curve for a high-frequency component to discriminate a signal bit rate. Based on a discrimination result from the signal input discrimination section and the bit rate discrimination section, the multirate burst mode receiver switches a setting for an optical signal reception section and a serial-parallel converter corresponding to the reception bit rate.

14 Claims, 9 Drawing Sheets

| | HIGH BIT RATE | LOW BIT RATE |
|---|---|---|
| 51 — INPUT DISCRIMINATION SIGNAL | High | High |
| 61 — BIT RATE DISCRIMINATION SIGNAL | High | Low |

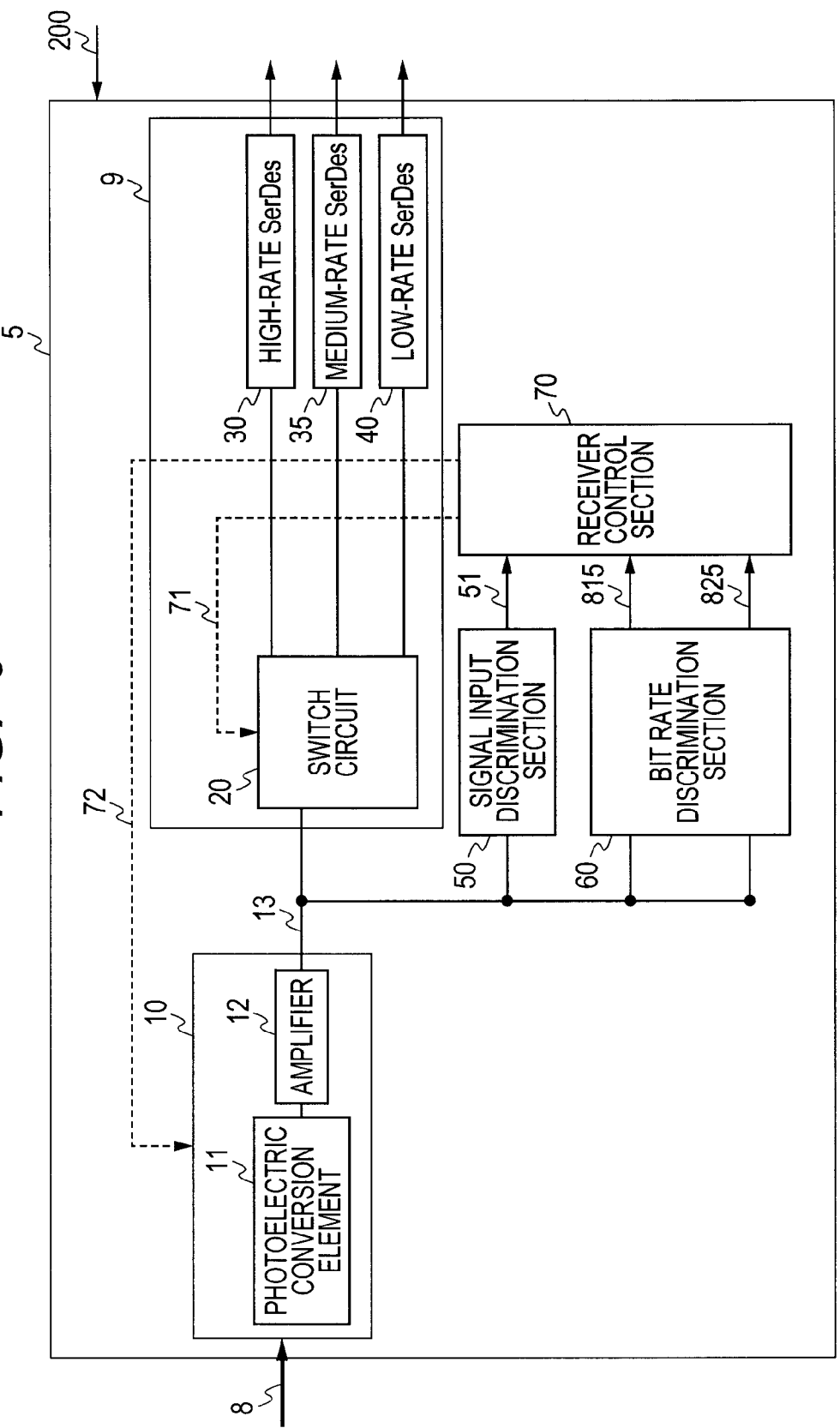

MULTIRATE BURST MODE RECEIVER

CLAIM OF PRIORITY

The present application claims priority from Japanese patent application JP 2010-055283 filed on Mar. 12, 2010, the content of which is hereby incorporated by reference into this application.

FIELD OF THE INVENTION

The present invention relates to a multirate reception technology for a burst mode receiver in a PON system.

BACKGROUND OF THE INVENTION

A PON (Passive Optical Network) system provides a high-speed and large-capacity optical access system in which multiple ONUs (Optical Network Units) share an optical fiber or an OLT (Optical Line Termination). The system supports the FTTH service as a technology capable of reducing costs per user. In the PON system, a downstream signal from OLT to ONU is equivalent to a continuous signal. An upstream signal from ONU to OLT is equivalent to a burst signal because the OLT uses time-division multiplexing for preventing collision. The OLT receives different levels of optical signals because the distance between the OLT and the ONU depends on users. Accordingly, the OLT needs to use a receiver that has high reception sensitivity and is capable of achieving a wide dynamic range.

The PON system is expected to provide more high-speed services. At the initial stage of a high-speed service, however, all existing users do not need the service. There may be a situation where existing bit-rate ONUs and high bit-rate ONUs exist mixedly. In such a situation, there is a need to control operation costs of telecommunications carriers and promote smooth migration from the existing system. To solve this problem, the OLT needs to use a multirate burst mode receiver, a capability of receiving burst signals at multiple bit rates. The IEEE 802.3av task force standardized 10G-EPON, a PON system at the transmission rate of 10.3125 Gbps. With regard to 10G-EPON, IEE Std 802.3av-2009 defines physical layer specifications for burst mode receivers compliant with burst signals at transmission rates of 10.3125 Gbps and 1.25 Gbps so that the OLT can concurrently accommodate OLTs compatible with GE-PON as an existing system.

Generally, the burst mode receiver includes a SerDes (Serializer/Deserializer) circuit that performs clock synchronization with a photoelectrically converted burst signal and converts a serial signal into a parallel signal. Let us consider a situation where the OLT receives burst signals at multiple bit rates. When the OLT receives a bit-rate signal incompatible with the SerDes circuit, an incorrect reception signal and clock is transmitted to a higher layer to cause malfunction. To solve this problem, the multirate burst mode receiver requires a function to control output to the SerDes circuit in accordance with signal transmission rates or a function to control SerDes-compatible bit rates.

In the PON system, the distance between the OLT and the ONU depends on users. The OLT receives optical signals at different levels. Accordingly, the burst mode receiver needs to have high reception sensitivity and a wide dynamic range. When burst signals are received at multiple bit rates, an optimum gain and band of an amplifier depends on the bit rate of a reception signal. Therefore, the amplifier setting needs to vary with bit rates so that the multirate burst mode receiver ensures high sensitivity.

Several technologies have been proposed with respect to multirate receivers. According to the technology described in K. Hara, et al. "Burst-mode Bit-rate Discrimination Circuit for 1.25/10.3-Gbit/s Dual-rate PON Systems" OFC2009, a TIA (TransImpedance Amplifier) output is split. Limit amplifiers corresponding to low and high bit rates amplify signals. The amplified signal is synthesized with a preamble pattern (contiguous 1s and 0s) and a 1-bit delayed signal. The bit rate discrimination is performed on the synthesized signal to control an input to the SerDes circuit.

The technology disclosed in JP-A-2007-243285 supports multiple bit rates by switching between an amplifier gain and a SerDes reference clock based on a control signal detected in the MAC layer based on an ONU transmission time slot. According to the technology disclosed in JP-A-2005-348047, a CDR (Clock Data Recovery) for reproducing a clock signal in the SerDes circuit compares the clock of an input signal with its own reference clock to discriminate a bit rate of the input signal and selects a subsequent signal processing circuit.

SUMMARY OF THE INVENTION

However, the method described in IEE Std 802.3av-2009 complies with only a preamble pattern of consecutive 1s and 0s. The technology is inapplicable to the 10G-EPON standard that does not use a preamble pattern of consecutive 1s and 0s, for example. Signals need to be accurately delayed one bit. Designing a delay circuit is technically difficult. The technology described in JP-A-2007-243285 requires a low-speed control signal for registering an ONU. The ONU needs to include a multirate transmitter. For example, the ONU needs to be changed because the 10G-EPON standard specifies only a single bit rate for ONU transmission. In addition, a control line from a MAC chip is needed. There may be a problem of connectivity with chips in higher-order layers. The method described in JP-A-2005-348047 uses the time-consuming bit rate decision and is therefore applicable to only continuous signals.

The above-mentioned conventional examples require the ONU to use special capabilities in order to provide a multirate burst mode receiver compliant with various PON systems. For example, the method described in IEE Std 802.3av-2009 needs to change the preamble pattern. The method described in JP-A-2005-348047 requires the ONU to have a capability of transmission at multiple bit rates. The OLT is supposed to connect with ONUs manufactured by multiple apparatus vendors. The unavoidable use of a non-standardized capability is unacceptable in terms of telecommunications carriers. The PON system needs to comply with high-speed burst signals.

It is therefore an object of the present invention to provide a multirate burst mode receiver for an OLT to be capable of receiving a high-speed burst signal without the need for a special capability of an ONU in a PON system including a mix of ONUs at different transmission bit rates.

A multirate burst mode receiver according to the invention includes a signal input discrimination section and a bit rate discrimination section. The signal input discrimination section detects an average amplitude to discriminate signal input. The bit rate discrimination section detects an envelope curve for a high-frequency component to discriminate a signal bit rate. Based on a discrimination result from the signal input discrimination section and the bit rate discrimination section, the multirate burst mode receiver switches a setting for an optical signal reception section and a serial-parallel converter corresponding to the reception bit rate.

The bit rate discrimination according to the invention uses frequency characteristics dependent on transmission bit rates of burst signals. An ONU requires no special function. The bit rate discrimination is free from preamble patterns. The bit rate discrimination and control is available inside the burst mode receiver. This eliminates the need for a control line from a higher-layer chip and makes interconnection easy. Since the bit rate discrimination takes a short time, the burst mode receiver can comply with high-speed burst signals and provide high communication efficiency.

BRIEF DESCRIPTION OF THE DRAWINGS

FIG. 8 shows operation verification of a bit rate discrimination section 60 according to the first embodiment using simulation, in which

FIG. 9 is a configuration diagram according to a second embodiment of the invention;

DETAILED DESCRIPTION OF THE PREFERRED EMBODIMENTS

Figure 1:
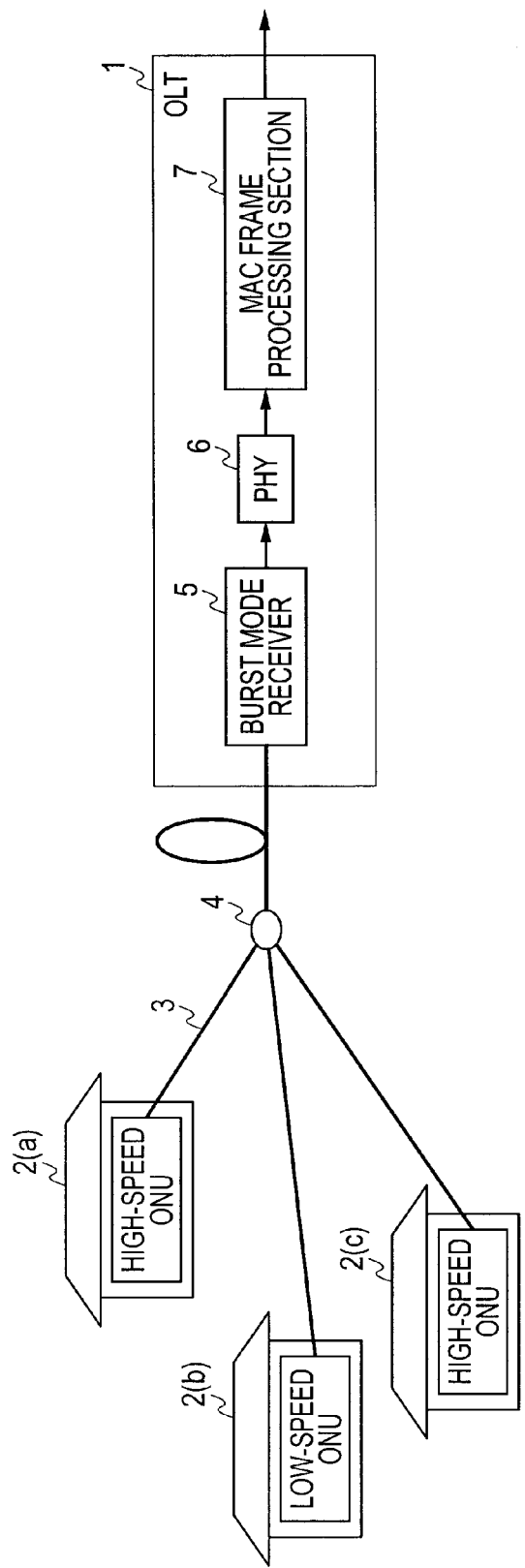
FIG. 1 shows a configuration example of a PON system according to the invention.

FIG. 1 is a configuration block diagram showing a PON system according to the invention. As shown in FIG. 1, the entire system includes multiple ONUs 2 using different transmission bit rates, an optical fiber 3, and an optical splitter 4. The optical fiber 3 and the optical splitter 4 are provided between the OLT 1 and each of the ONUs 2. As an internal configuration, the OLT 1 includes a multirate burst mode receiver 5 according to the invention, a PHY 6, and a MAC frame processing section 7. The multirate burst mode receiver 5 performs photoelectric conversion on burst signals having multiple bit rates and performs clock synchronization. The PHY 6 encodes and decodes a PON frame. The MAC frame processing section 7 processes a MAC frame and is connected to an external network.

Embodiments of the present invention will be described in further detail with reference to the accompanying drawings. The mutually corresponding parts in the drawings are designated by the same reference numerals.

First Embodiment

Figure 2:
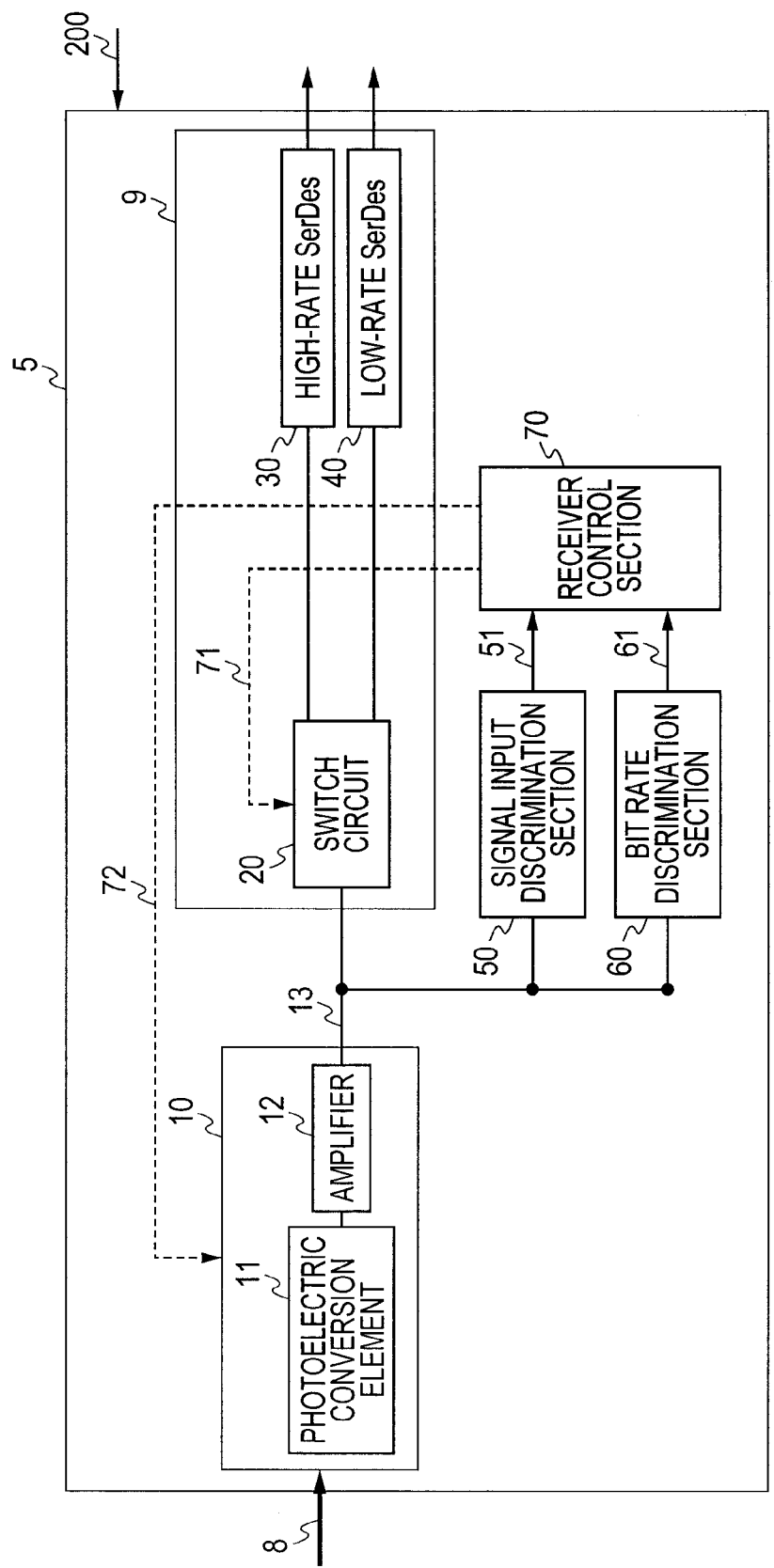
FIG. 2 is a configuration diagram of a first embodiment of the invention.

The following describes the burst mode receiver 5 according to the first embodiment of the invention with reference to FIG. 2. As shown in FIG. 1, the first embodiment assumes that the same PON system includes two types of ONUs, one for high-rate transmission and the other for low-rate transmission.

Description of the Circuit Configuration

The burst mode receiver 5 according to the invention includes an optical signal reception section 10, a serial-parallel converter 9, a signal input discrimination section 50, a bit rate discrimination section 60, and a bit rate discrimination control section 70. The optical signal reception section 10 converts an optical input signal 8 into an amplifier output signal 13. The serial-parallel converter 9 includes as many SerDes circuits as reception bit rate types. The SerDes circuit performs clock synchronization with the amplifier output signal 13 and converts a serial signal into a parallel signal. The signal input discrimination section 50 discriminates a burst signal input based on the amplifier output signal 13 and outputs an input discrimination signal 51. The bit rate discrimination section 60 detects a high-frequency component based on the amplifier output signal 13 and outputs a bit rate discrimination signal 61. The bit rate discrimination control section 70 discriminates an input signal transmission rate based on the input discrimination signal 51 and the bit rate discrimination signal 61. Based on the discrimination result, the bit rate discrimination control section 70 outputs an output switching signal 71 and a mode switching signal 72. The output switching signal 71 switches an output to the corresponding SerDes circuit. The mode switching signal 72 changes the optical signal reception section 10 to a setting appropriate to the input bit rate.

Description of the Optical Signal Reception Section 10

Figure 3:
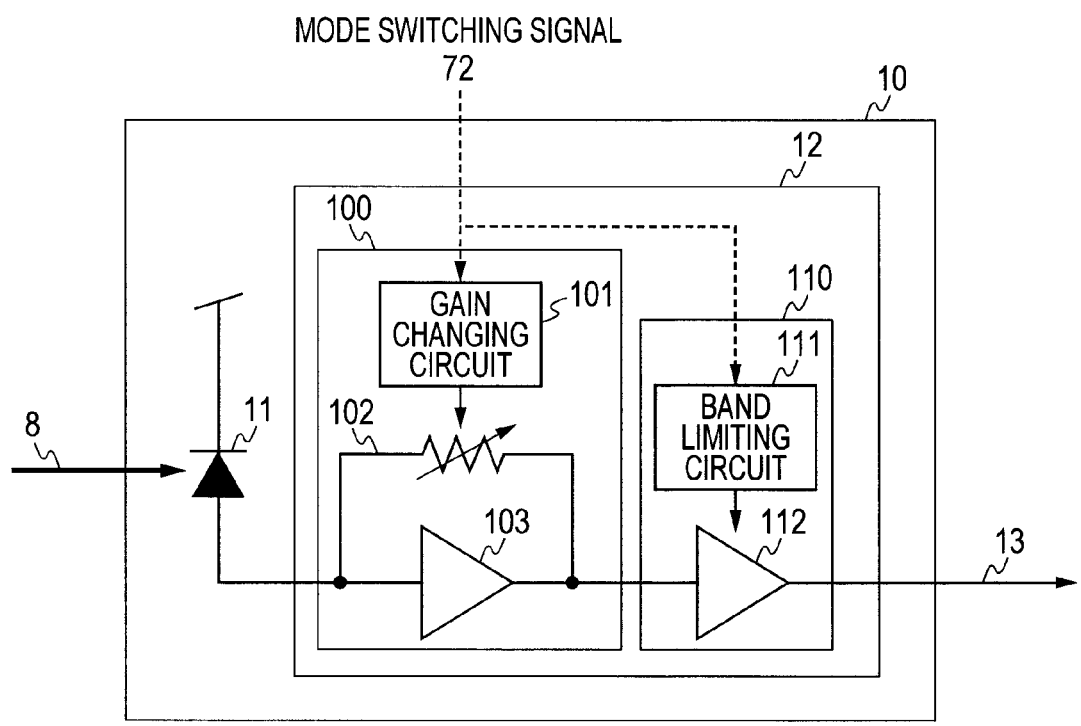
FIG. 3 shows a configuration example of an optical signal reception section 10 according to the first embodiment.

The optical signal reception section 10 includes a photoelectric conversion element 11 and an amplifier 12. The photoelectric conversion element 11 converts the optical input signal 8 into an electric current signal. The amplifier 12 converts the electric current signal from the photoelectric conversion element 11 into a voltage signal, amplifies the signal to an appropriate amplitude, and outputs the signal as an amplifier output signal 13. A configuration example of the optical signal reception section will be described with reference to FIG. 3. The photoelectric conversion element 11 is equivalent to an APD (Avalanche PhotoDiode), for example. The amplifier 12 includes a transimpedance amplifier 100 and a limit amplifier 110. The transimpedance amplifier 100 converts a current signal into a voltage signal. The limit amplifier 110 amplifies the voltage signal to a specified amplitude and outputs the signal as an amplifier output. The transimpedance amplifier 100 includes a gain changing circuit 101, a feedback resister 102, and an operational amplifier 103. When supplied with the mode switching signal 72, the gain changing circuit 101 changes the magnitude of the feedback resister 102 and supplies the transimpedance amplifier 100 with a gain and a band appropriate to the reception bit rate. The limit amplifier 110 includes a band limiting circuit 111 and a limiting amplifier circuit 112. When supplied with mode switching signal 72, the band limiting circuit 111 limits a transmission band for the limiting amplifier circuit 112 to improve an S/N ratio and reception sensitivity. The optical signal reception section is not limited to this configuration and may be otherwise configured so as to be capable of applying an appropriate setting to the reception bit rate. For example, the limit amplifier 110 may include parallel connected modules each corresponding to a high bit rate and a low bit rate instead of the single module. The mode switching signal 72 may select the amplifier output signal 13. The mode switching signal 72 may control any device and parameter. For example, the mode switching signal 72 may change a multiplication factor of the photoelectric conversion element 11.

Description of the Serial-Parallel Converter 9

The serial-parallel converter 9 includes a switch circuit 20, a high-rate SerDes circuit 30, and a low-rate SerDes circuit 40. The switch circuit 20 switches an output destination of the amplifier signal 13 to the high-rate SerDes circuit 30 or the low-rate SerDes circuit 40 in accordance with the output switching signal 71. The switch circuit 20 can be provided using a cross-point switch, for example. The high-rate SerDes circuit 30 and the low-rate SerDes circuit 40 perform clock synchronization with the amplifier output signal 13 supplied through the switch circuit 20, convert a serial signal into a parallel signal, and output the signal to the subsequent PHY 6.

Description of the Signal Input Discrimination Section 50

Figure 4:
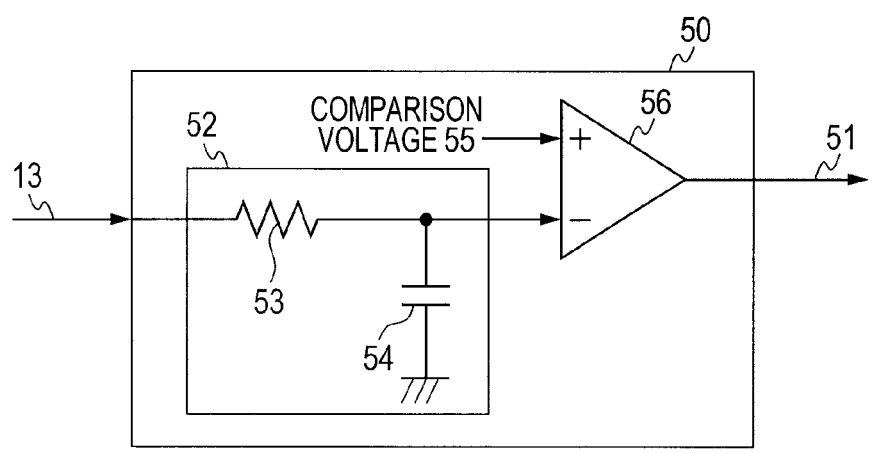
FIG. 4 shows a configuration example of a signal input discrimination section 50 according to the first embodiment.

FIG. 4 shows a configuration of the signal input discrimination section 50. The signal input discrimination section 50 includes an average detection circuit 52 and a comparator 56. The average detection circuit 52 outputs an average of the amplitude from the amplifier output signal 13. As shown in FIG. 4, for example, the average detection circuit 52 can be configured as an integration circuit including a resistor 53 and a capacitor 54. The average detection circuit 52 may be configured otherwise. The comparator 56 is supplied with a comparison voltage 55 at the positive side and is supplied with an output from the average detection circuit 52 at the negative side. When an output from the average detection circuit 52 exceeds the comparison voltage 55, the comparator 56 changes the output level of the input discrimination signal 51 from low to high.

Description of the Bit Rate Discrimination Section 60

The bit rate discrimination section 60 includes a high bit rate discrimination circuit 82. The high bit rate discrimination circuit 82 includes a high-pass filter 62, a high-frequency detector 63, and a comparison voltage 65. The high-pass filter 62 attenuates a low-frequency component of the amplifier output signal 13 and transmits a high-frequency component. A cutoff frequency for the high-pass filter 62 is selected so as to sufficiently attenuate frequency components contained in a low bit rate signal. The high-frequency detector 63 outputs an envelope curve for high-frequency components in the amplifier output signal 13 that is transmitted from the high-pass filter 62. The comparator 65 is supplied with a comparison voltage 64 at the positive side and is supplied with an output from the high-frequency detector 63 at the negative side. The comparison voltage 64 is selected so as to be larger than the peak value of an envelope output from the low bit rate signal and to be smaller than the peak value of an envelope output from the high bit rate signal. When an output from the high-frequency detector 63 exceeds the comparison voltage 64, the comparator 65 changes the output level of the bit rate discrimination signal 61 from low to high.

Description of the Receiver Control Section 70

The receiver control section 70 discriminates a reception bit rate using the input discrimination signal 51 from the signal input discrimination section 50 and the bit rate discrimination signal 61 from the bit rate discrimination section 60. Based on the discrimination result, the receiver control section 70 outputs an output switching signal 71 and a mode switching signal 72. A reception bit rate discrimination criterion for the receiver control section 70 will be described later.

Description of Operations According to the First Embodiment

Figure 7:
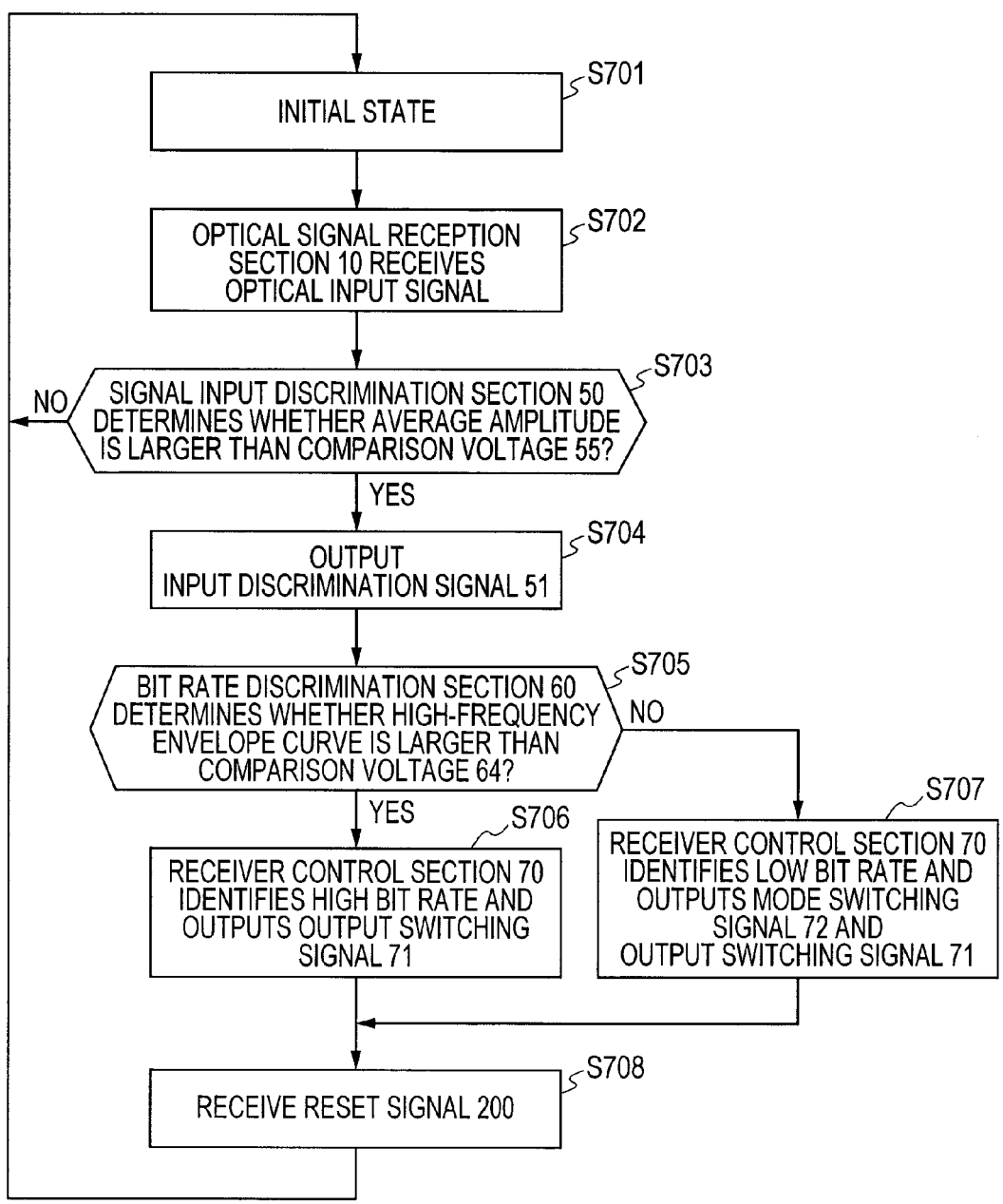
FIG. 7 is a flowchart showing example operations according to the first embodiment.

The following describes example operations according to the first embodiment with reference to FIG. 7. As an initial state of the embodiment, the optical signal reception section 10 is configured for the high bit rate. An output from the switch circuit 20 is supplied to neither the high-rate SerDes circuit 30 nor the low-rate SerDes circuit 40 (S701).

When the optical signal reception section 10 receives the optical input signal 8 (S702), the photoelectric conversion element 11 and the amplifier 12 apply photoelectric conversion to the signal. The signal is output as the amplifier output signal 13. The amplifier output signal 13 is separately input to the serial-parallel converter 9, the signal input discrimination section 50, and the bit rate discrimination section 60. At this stage, the switch circuit 20 of the serial-parallel converter 9 closes the output. The amplifier output signal 13 is not transmitted to the subsequent SerDes circuits.

When the signal input discrimination section 50 receives the amplifier output signal 13, the comparator 56 compares the average amplitude output from the average detection circuit 52 with the comparison voltage 55 (S703). When the average amplitude is larger than the. comparison voltage 55, the comparator 56 outputs the input discrimination signal 51. This discriminates a burst signal input (S704).

When the bit rate discrimination section 60 receives the amplifier output signal 13, the high-pass filter 62 attenuates a low-frequency component and transmits a high-frequency component. The high-frequency detector 63 outputs an envelope curve for the high-frequency component passing through the high-pass filter 62 to the comparator 65. When an output from the high-frequency detector 63 exceeds the comparison voltage 64, the comparator 65 outputs the bit rate discrimination signal 61. This determines whether the reception signal has a high bit rate (S705).

Figures 5, 6:
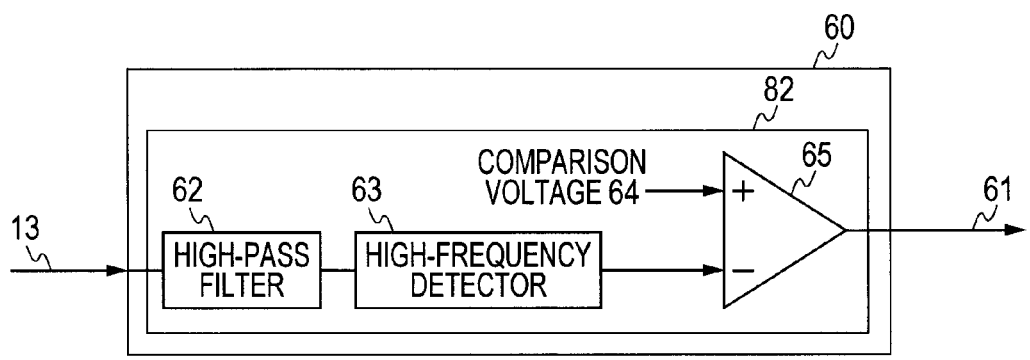
FIG. 5 shows a configuration example of a bit rate discrimination section 60 according to the first embodiment.
FIG. 6 shows a bit rate discrimination criterion in a receiver control section 70 according to the first embodiment.

The receiver control section 70 receives the input discrimination signal 51 and determines that the time capable of the bit rate discrimination elapses in the bit rate discrimination section 60. The receiver control section 70 then uses the mode switching signal 72 and the output switching signal 71 to control the receiver in accordance with the discrimination criterion shown in FIG. 6. The burst signal is assumed to have a high bit rate when the input discrimination signal 51 and the bit rate discrimination signal 61 are output as the high level. The output switching signal 71 controls the switch circuit 20 to transmit the amplifier output 13 to the high-rate SerDes circuit 30 (S706). The burst signal is assumed to have a low bit rate when the input discrimination signal 51 is set to the high level and the bit rate discrimination signal 61 remains the low level. The output switching signal 71 controls the switch circuit 20 to transmit the amplifier output 13 to the low-rate SerDes circuit 40. The mode switching signal 72 changes the optical signal reception section 10 to the mode for low bit rates (S707).

When the PHY 6 detects the end of the burst signal, a reset signal 200 is input to the burst mode receiver 5 to resume the initial state (S708). The reset signal 200 is generated from the output function provided for general PHY chips. Instead of the PHY chip, the burst mode receiver 5 may contain a self-reset circuit.

The above-mentioned operations can provide the multirate burst mode receiver without the need for any special function in the ONU and a special control line from a higher-order chip.

Verifying Operations of the Bit Rate Discrimination Section 60 Using Simulation

Figure 8A:
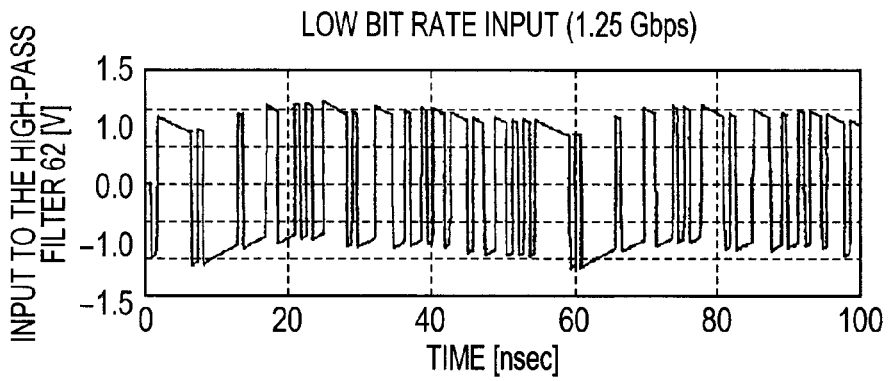
FIG. 8A shows a low bit-rate waveform.
Figure 8B:
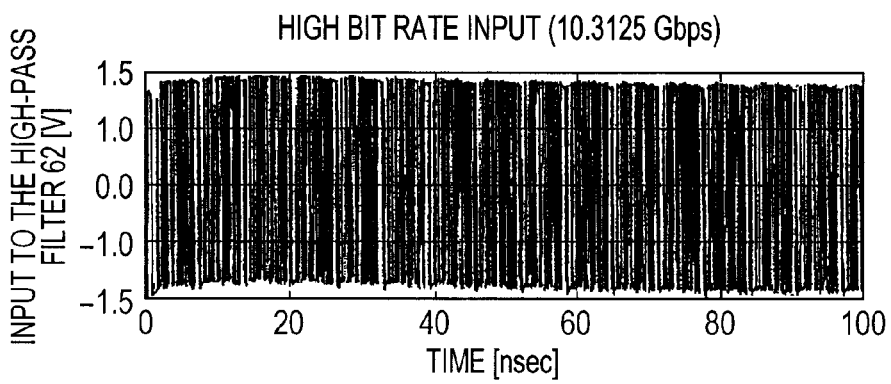
FIG. 8B shows a high bit-rate waveform.
Figure 8C:
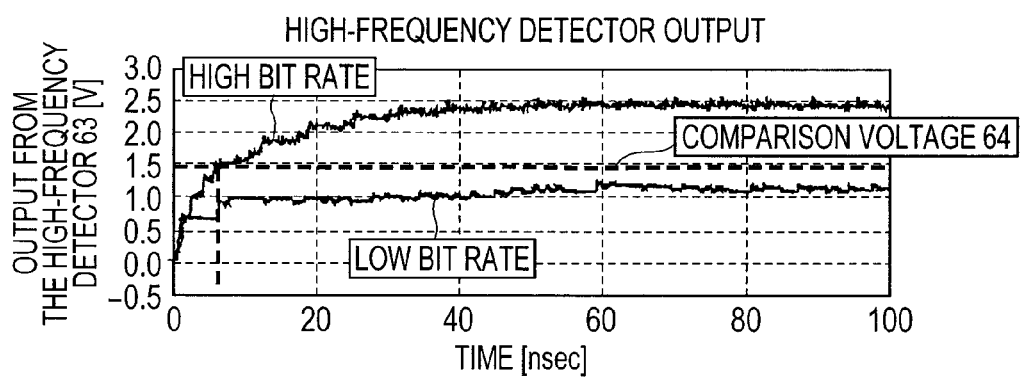
FIG. 8C shows an envelope curve acquired from a high-frequency detector.

The burst mode receiver in the PON system receives high-speed burst signals and is requested to ensure as fast bit rate discrimination as possible. The inventors verified operations of the bit rate discrimination section 60 using simulation. FIG. 8 shows a result of the simulation. The simulation assumes two types of ONUs, i.e., GE-PON at the transmission rate of 1.25 Gbps (low bit rate) and 10G-EPON at the transmission rate of 10.3125 Gbps (high bit rate) compliant with the IEEE standardization. FIG. 8A shows a low bit rate waveform and FIG. 8B shows a high bit rate waveform both input to the bit rate discrimination section 60. The simulation uses the 10G-EPON standard preamble pattern as a signal pattern for both bit rates. FIG. 8C shows an envelope curve generated from the high-frequency detector 63 when both waveforms are input to the high-pass filter 62. The cutoff frequency of the high-pass filter 62 is assumed to be 1.25 GHz. According to the simulation result, the high bit rate signal output exceeds the peak value for the low bit rate signal output in 10 nsec or earlier after the input starts. When the comparison voltage 64 is set to 1.5 V, for example, the burst mode receiver can be considered to reach a level capable of the bit rate discrimination in 10 nsec or earlier. Burst mode receivers in the 10G-EPON are defined to ensure the signal stabilization time shorter than 800 nsec. The bit rate discrimination is available in the time sufficiently shorter than that value and is fully compliant with high-speed burst signals. The preamble can be shortened in accordance with data. The high communication efficiency is available.

Second Embodiment

The following describes the burst mode receiver 5 according to the second embodiment of the invention with reference to FIG. 9. Unlike the first embodiment, the second embodiment assumes that the same PON system includes three types of ONUs, i.e., high-speed, medium-speed, and low-speed ONUs.

Description of the Circuit Configuration

Similarly to the first embodiment, the burst mode receiver 5 according to the embodiment includes the optical signal reception section 10, the serial-parallel converter 9, the signal input discrimination section 50, the bit rate discrimination section 60, and the receiver control section 70.

Description of the Optical Signal Reception Section 10

According to the mode switching signal 72, the optical signal reception section 10 can be changed to an optimum setting corresponding to each of three types of bit rates.

Description of the Serial-Parallel Converter 9

To comply with three types of bit rates, the serial-parallel converter 9 includes the switch circuit 20, the high-rate SerDes circuit 30, a medium-rate SerDes circuit 35, and the low-rate SerDes circuit 40. The switch circuit 20 transmits the amplifier output signal 13 to the SerDes circuit for the corresponding bit rate in accordance with the output switching signal 71.

Description of the Signal Input Discrimination Section 50

Similarly to the first embodiment, the signal input discrimination section 50 detects the average amplitude for the amplifier output signal 13, discriminates a burst signal input, and outputs the input discrimination signal 51.

Description of the Bit Rate Discrimination Section 60

Figures 10, 11:
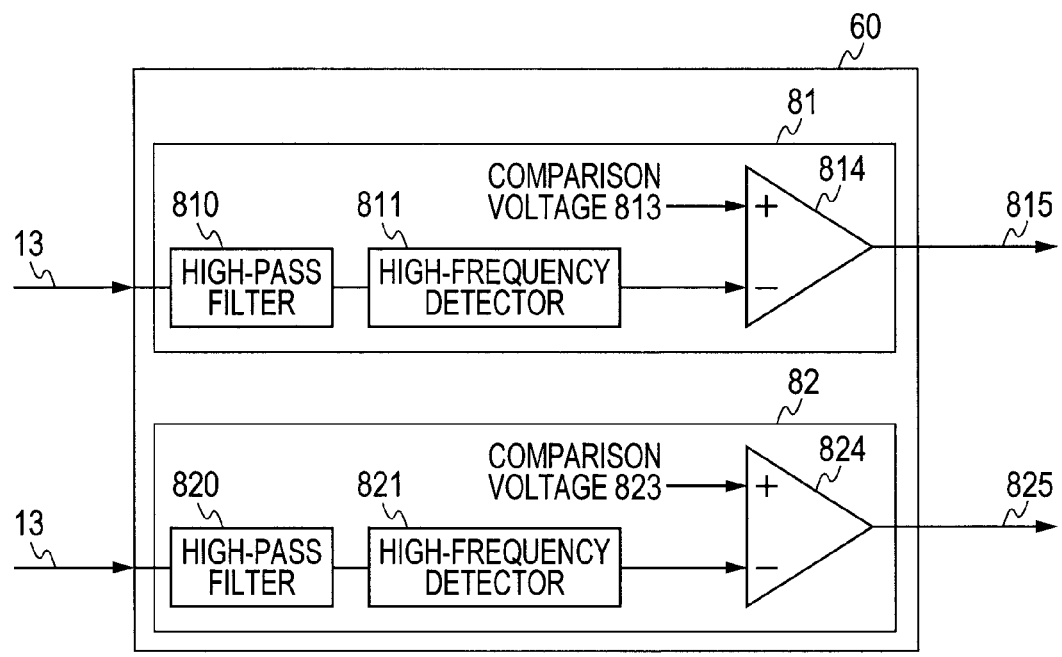
FIG. 10 shows a configuration example of the bit rate discrimination section 60 according to the second embodiment.
FIG. 11 shows a bit rate discrimination criterion in the receiver control section 70 according to the second embodiment.

FIG. 10 shows a configuration example of the bit rate discrimination section 60 according to the second embodiment. To discriminate three types of bit rates, the bit rate discrimination section 60 according to the embodiment includes a medium bit rate discrimination circuit 81 and a high bit rate discrimination circuit 82. The amplifier output signal 13 is input to both the medium bit rate discrimination circuit 81 and the high bit rate discrimination circuit 82. The medium bit rate discrimination circuit 81 and the high bit rate discrimination circuit 82 each include the high-pass filter, the high-frequency detector, and the comparator. The cutoff frequency for the high-pass filter 810 is used to select a value that sufficiently attenuates frequency components of a low bit rate signal. The cutoff frequency for the high-pass filter 820 is used to select a value that sufficiently attenuates frequency components of a low bit rate signal and a medium bit rate signal. When an output from the high-frequency detector 811 exceeds the comparison voltage 813 in the medium bit rate discrimination circuit 81, the comparator 814 causes the output level to be high and outputs a medium bit rate discrimination signal 815. Similarly, when an output from the high-frequency detector 821 exceeds the comparison voltage 823 in the high bit rate discrimination circuit 82, the comparator 824 causes the output level to be high and outputs a high bit rate discrimination signal 825.

Description of the Receiver Control Section 70

The receiver control section 70 discriminates a reception bit rate using the input discrimination signal 51 from the signal input discrimination section 50 and the medium bit rate discrimination signal 815 and the high bit rate discrimination signal 825 from the bit rate discrimination section 60. Based on the discrimination result, the receiver control section 70 outputs the output switching signal 71 and the mode switching signal 72. A reception bit rate discrimination criterion for the receiver control section 70 according to the embodiment will be described later.

Description of Operations According to the Second Embodiment

The following describes an operation example according to the second embodiment. As an initial state of the embodiment, the optical signal reception section 10 is also configured for the high bit rate. The switch circuit 20 closes the output to all the SerDes circuits When the optical signal reception section 10 receives the optical input signal 8, the photoelectric conversion element 11 and the amplifier 12 apply photoelectric conversion to the signal. The signal is output as the amplifier output signal 13. The amplifier output signal 13 is separately input to the serial-parallel converter 9, the signal input discrimination section 50, and medium bit rate discrimination circuit 81 and the high bit rate discrimination circuit 82 in the bit rate discrimination section 60.

When the signal input discrimination section 50 receives the amplifier output signal 13, the comparator 56 compares the average amplitude output from the average detection circuit 52 with the comparison voltage 55. When the average amplitude exceeds the comparison voltage 55, the comparator 56 outputs the input discrimination signal 51.

When the bit rate discrimination section 60 receives the amplifier output signal 13, the high-pass filter 810 of the medium bit rate discrimination circuit 81 and the high-pass filter 820 of the high bit rate discrimination circuit 82 each attenuate low-frequency components in accordance with the corresponding cutoff frequencies and transmit high-frequency components. The high-frequency detectors 811 and 821 output envelope curves for the high-frequency components passing through the high-pass filters 810 and 820 to the comparators 814 and 824. The high-pass filter 810 sufficiently attenuates frequency components of a low bit rate signal. Therefore, the comparator 814 outputs the medium bit rate discrimination signal 815 when a medium or high bit rate signal is input. The high-pass filter 820 sufficiently attenuates frequency components of medium and low bit rate signals. Therefore, the comparator 824 outputs the high bit rate discrimination signal 825 only when a high bit rate signal is input.

The receiver control section 70 receives the input discrimination signal 51 and determines that the time capable of the bit rate discrimination elapses in the bit rate discrimination section 60. The receiver control section 70 then uses the mode switching signal 72 and the output switching signal 71 to control the receiver in accordance with the discrimination criterion shown in FIG. 11. A high bit rate signal is assumed when the input discrimination signal 51, the medium bit rate discrimination signal 815, and the high bit rate discrimination signal 825 are all output as the high level. The output switching signal 71 controls the switch circuit 20 to transmit the amplifier output 13 to the high-rate SerDes circuit 30. A medium bit rate signal is assumed when the input discrimination signal 51 and the medium bit rate discrimination signal 815 are set to the high level and the high bit rate discrimination signal 825 remains the low level. The output switching signal 71 controls the switch circuit 20 to transmit the amplifier output 13 to the medium-rate SerDes circuit 35. The mode switching signal 72 changes the optical signal reception section 10 to the mode for medium bit rates. A low bit rate signal is assumed when the input discrimination signal 51 is set to the high level and the medium bit rate discrimination signal 815 and the high bit rate discrimination signal 825 remain the low level. The output switching signal 71 controls the switch circuit 20 to transmit the amplifier output 13 to the low-rate SerDes circuit 40. The mode switching signal 72 changes the optical signal reception section 10 to the mode for low bit rates.

When the PHY 6 detects the end of the burst signal, the reset signal 200 is input to the burst mode receiver 5 to resume the initial state.

The above-mentioned operations can provide the multirate burst mode receiver for a system that includes three types of ONUs having different transmission bit rates.

Third Embodiment

Figure 12:
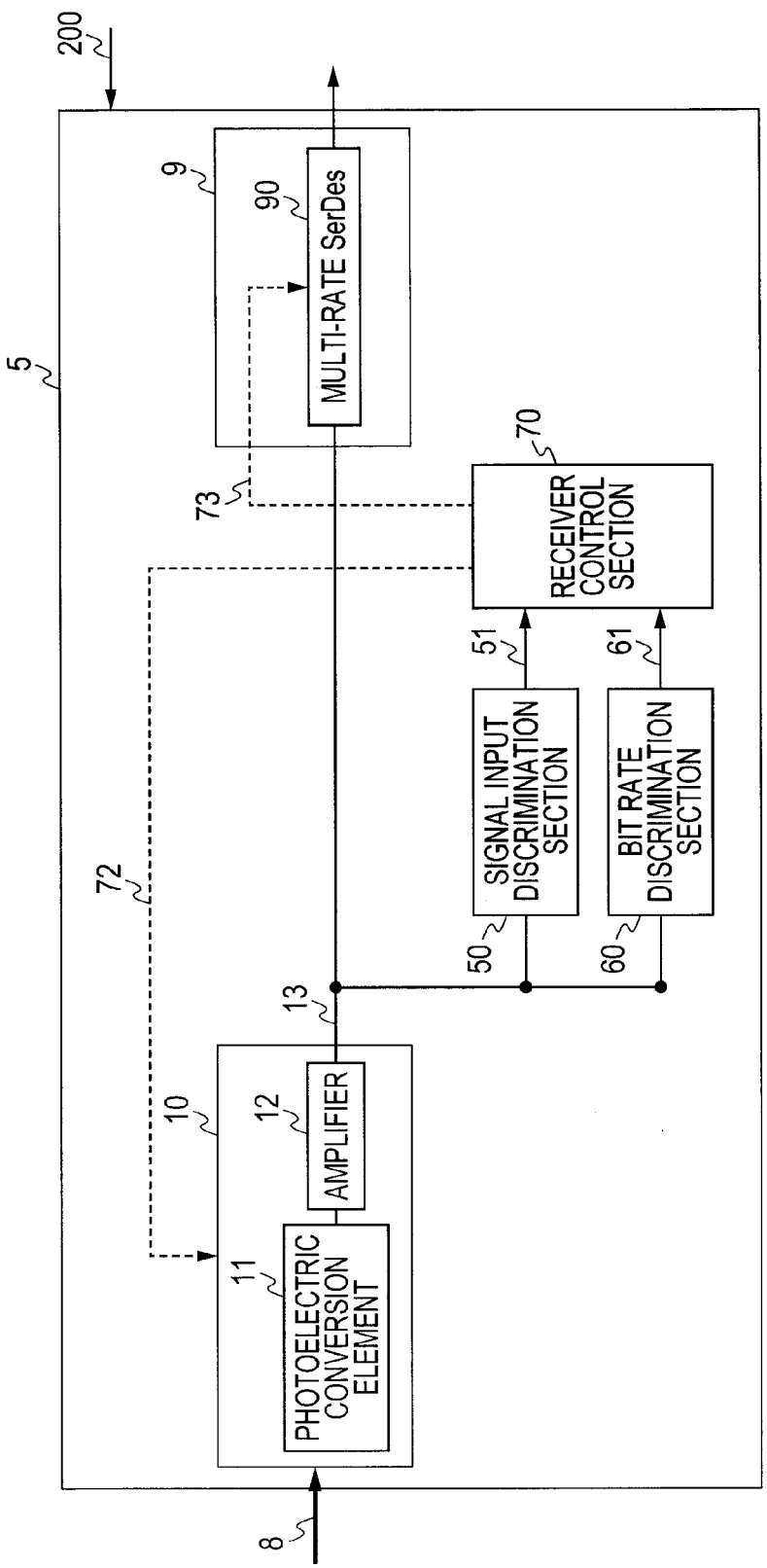
FIG. 12 is a configuration diagram according to a third embodiment of the invention.

The following describes the burst mode receiver 5 according to the third embodiment of the invention with reference to FIG. 12. Similarly to the first embodiment, the third embodiment assumes that the same PON system includes two types of ONUs, i.e., high-speed and low-speed ONUs.

Description of the Circuit Configuration

Similarly to the first embodiment, the burst mode receiver 5 according to the third embodiment includes the optical signal reception section 10, the serial-parallel converter 9, the signal input discrimination section 50, the bit rate discrimination section 60, and the receiver control section 70. The third embodiment differs from the first embodiment in the configuration of a serial-parallel conversion circuit 9. The serial-parallel conversion circuit 9 according to the embodiment includes a multi-rate SerDes circuit 90 that switches reference clocks in accordance with different bit rates. Based on the bit rate discrimination result, the receiver control section 70 outputs the mode switching signal 72 and a reference clock switching signal 73 that switches reference clocks for the multi-rate SerDes circuit.

Description of Operations According to the Third Embodiment

The following describes an operation example according to the third embodiment. As an initial state of the embodiment, the optical signal reception section 10 is configured for the high bit rate. No reference clock is input to the multi-rate SerDes circuit 90.

When the optical signal reception section 10 receives the optical input signal 8, the photoelectric conversion element 11 and the amplifier 12 apply photoelectric conversion to the signal. The signal is output as the amplifier output signal 13. The amplifier output signal 13 is separately input to the serial-parallel converter 9, the signal input discrimination section 50, and the bit rate discrimination section 60.

When the signal input discrimination section 50 receives the amplifier output signal 13, the comparator 56 compares the average amplitude output from the average detection circuit 52 with the comparison voltage 55. When the average amplitude is larger than the comparison voltage 55, the comparator 56 outputs the input discrimination signal 51.

When the bit rate discrimination section 60 receives the amplifier output signal 13, the high-pass filter 62 attenuates a low-frequency component and transmits a high-frequency component. The high-frequency detector 63 outputs an envelope curve for the high-frequency component passing through the high-pass filter 62 to the comparator 65. When an output from the high-frequency detector 63 exceeds the comparison voltage 64, the comparator 65 outputs the bit rate discrimination signal 61.

The receiver control section 70 receives the input discrimination signal 51 and determines that the time capable of the bit rate discrimination elapses in the bit rate discrimination section 60. The receiver control section 70 then uses the mode switching signal 72 and the reference clock switching signal 73 to control the receiver. The burst signal is assumed to have a high bit rate when the input discrimination signal 51 and the bit rate discrimination signal 61 are output as the high level. The reference clock switching signal 73 sets the reference clock for the multi-rate SerDes circuit 90 to a frequency corresponding to the high bit rate. The burst signal is assumed to have a low bit rate when the input discrimination signal 51 is set to the high level and the bit rate discrimination signal 61 remains the low level. The reference clock switching signal 73 sets the reference clock for the multi-rate SerDes circuit 90 to a frequency corresponding to the low bit rate. The mode switching signal 72 changes the optical signal reception section 10 to the mode for low bit rates.

When the PHY 6 detects the end of the burst signal, the reset signal 200 is input to the burst mode receiver 5 to resume the initial state.

The above-mentioned operations can provide the multirate burst mode receiver using the multi-rate SerDes circuit.

Others

While there have been described specific preferred embodiments of the present invention, the invention may be embodied in various modifications without departing from the spirit and scope of the invention. For example, the invention may be applicable to four or more types of bit rates by adding more circuits equivalent to the medium bit rate discrimination circuit 81 and the high bit rate discrimination circuit 82.

What is claimed is:

1. A burst mode receiver included in an optical line termination (OLT), comprising:
   an optical signal reception section supplied with a burst signal;
   a serial-parallel converter that performs synchronization with an output signal from the optical signal reception section and converts a serial signal into a parallel signal;
   a signal input discrimination section that detects an average value for an output signal from the optical signal reception section and discriminates a signal input;
   a bit rate discrimination section that detects a envelope curve for a high-frequency component in an output signal from the optical signal reception section; and
   a receiver control section that discriminates a bit rate for a burst signal supplied to the optical signal reception section according to a discrimination result from the signal input discrimination section and the bit rate discrimination section and changes a setting for the optical signal reception section and the serial-parallel converter.

2. The burst mode receiver according to claim 1, wherein the optical signal reception section includes:
   a photoelectric conversion element that converts an optical signal into an electric current signal; and an amplifier that converts the electric current signal into a voltage signal and performs wave shaping, wherein a mode switching signal controls a gain and a transmission band of the photoelectric conversion element and the amplifier.

3. The burst mode receiver according to claims 1, wherein the signal input discrimination section includes:

an average detection circuit that outputs an average amplitude for an output signal from the optical signal reception section; and a comparator that compares an output from the average detection circuit with a comparison voltage and outputs an input discrimination signal.

4. The burst mode receiver according to claim 1, wherein the bit rate discrimination section includes as many as (m−1) rate discrimination circuits, and wherein the rate discrimination circuit includes:

a high-pass filter that transmits a high-frequency component in an output signal from the optical signal reception section;

a high-frequency detector that detects an envelope curve for an output from the high-pass filter; and a comparator that compares an output from the high-frequency detector with a comparison voltage and outputs a rate discrimination signal.

5. The burst mode receiver according to claim 1, wherein the receiver control section discriminates input of a burst signal to the optical signal reception section and a bit rate in accordance with the input discrimination signal from the signal input discrimination section and the rate discrimination signal from the bit rate discrimination section and changes a setting for the optical signal reception section and the serial-parallel converter.

6. The burst mode receiver according to claim 1, wherein the serial-parallel converter includes: as many as m SerDes circuits each of which corresponds to one of m types of bit rates, performs clock synchronization and conversion from a serial signal to a parallel signal, and generates output to a subsequent PHY; and a switch circuit that controls whether or not to transmit an output signal from the optical signal reception section to the SerDes circuit in accordance with a control signal from the receiver control section.

7. The burst mode receiver according to claim 1, wherein the serial-parallel converter includes a multi-rate SerDes circuit that changes a reference clock used for clock synchronization to a frequency corresponding to a bit rate for an input burst signal in accordance with control from the receiver control section, performs clock synchronization on a burst signal and conversion from a serial signal to a parallel signal, and generates output to a subsequent PHY.

8. A passive optical network (PON) system in which an OLT is connected to a plurality of optical network units (ONUs) having different transmission bit rates through optical fiber, the OLT having an optical reception circuit that includes:

an optical signal reception section supplied with a burst signal;

a serial-parallel converter that performs synchronization with an output signal from the optical signal reception section and converts a serial signal into a parallel signal;

a signal input discrimination section that detects an average value for an output signal from the optical signal reception section and compares an output signal with a first comparison voltage;

a bit rate discrimination section that detects an envelope curve for a high-frequency component in an output signal from the optical signal reception section and compares an output signal with a second comparison voltage; and a receiver control section that discriminates a bit rate for a burst signal supplied to the optical signal reception section according to a result of comparison between the optical signal reception section and the bit rate discrimination section and changes a setting for the optical signal reception section and the serial-parallel converter.

9. The PON system according to claim 8, wherein the optical signal reception section included in the OLT includes:

a photoelectric conversion element that converts an optical signal into an electric current signal; and an amplifier that converts the electric current signal into a voltage signal and performs wave shaping, wherein a mode switching signal controls a gain and a transmission band of the photoelectric conversion element and the amplifier.

10. The PON system according to claims 8, wherein the signal input discrimination section included in the OLT includes:

an average detection circuit that outputs an average amplitude for an output signal from the optical signal reception section; and a comparator that compares an output from the average detection circuit with a comparison voltage and outputs an input discrimination signal.

11. The PON system according to claim 8, wherein the bit rate discrimination section included in the OLT includes as many as (m−1) rate discrimination circuits; and wherein the rate discrimination circuit includes:

a high-pass filter that transmits a high-frequency component in an output signal from the optical signal reception section;

a high-frequency detector that detects an envelope curve for an output from the high-pass filter; and a comparator that compares an output from the high-frequency detector with a comparison voltage and outputs a rate discrimination signal.

12. The PON system according to claim 8, wherein the receiver control section included in the OLT discriminates input of a burst signal to the optical signal reception section and a bit rate in accordance with the input discrimination signal from the signal input discrimination section and the rate discrimination signal from the bit rate discrimination section and changes a setting for the optical signal reception section and the serial-parallel converter.

13. The PON system according to claim 8, wherein the serial-parallel converter included in the OLT includes: as many as m SerDes circuits each of which corresponds to one of m types of bit rates, performs clock synchronization and conversion from a serial signal to a parallel signal, and generates output to a subsequent PHY; and a switch circuit that controls whether or not to transmit an output signal from the optical signal reception section to the SerDes circuit in accordance with a control signal from the receiver control section.

14. The PON system according to claim 8, wherein the serial-parallel converter included in the OLT includes a multi-rate SerDes circuit that changes a reference clock used for clock synchronization to a frequency corresponding to a bit rate for an input burst signal in accordance with control from the receiver control section, performs clock synchronization on a burst signal and conversion from a serial signal to a parallel signal, and generates output to a subsequent PHY.

* * * * *